Nov. 10, 1964

S. GELLER 3,156,651

LIGHT TRANSPARENT FERRIMAGNETIC GARNETS

Filed March 28, 1962

INVENTOR
S. GELLER
BY

ATTORNEY

INVENTOR
S. GELLER
BY
ATTORNEY

United States Patent Office 3,156,651
Patented Nov. 10, 1964

3,156,651
LIGHT TRANSPARENT FERRIMAGNETIC
GARNETS
Seymour Geller, Morristown, N.J., assignor to Bell Telephone Laboratories, Incorporated, New York, N.Y., a corporation of New York
Filed Mar. 28, 1962, Ser. No. 183,201
2 Claims. (Cl. 252—62.5)

This invention relates to substituted ferrimagnetic garnets. More particularly it concerns magnetic garnet systems with substitutions of silicon and germanium ions for the magnetic ion, thus providing a means for varying the magnetic moment and the crystal lattice constant of the garnet and also increasing its transparency.

The ferrimagnetic garnets have recently become of intense interest in the field of microwave devices. The ferrimagnetic properties of such materials may be utilized in a variety of devices such as isolators, modulators, circulators, gyrators and magnetic memory elements. More recently, these materials have been suggested for use in corresponding devices operating at light frequencies. Such a light frequency device is disclosed and claimed in United States Patent No. 2,974,568, issued March 14, 1961. These devices are particularly adapted for use in conjunction with optical masers which are now well known in the art and were first described in United States Patent No. 2,929,922, issued March 22, 1960. Many of these applications rely on the principle of Faraday rotation.

In a ferrimagnetic crystal such as yttrium iron garnet or a rare earth iron garnet, the magnetic ions (iron and magnetic rare earth) have ordered spin moments. Ions which have spin moments oriented in a direction parallel or antiparallel to the direction of propagation of radiation through the crystal will interact with the electromagnetic wave and will rotate the wave. The rotating influence will be opposite in direction for antiparallel spin orbiting ions as opposed to those aligned parallel to the wave. The application of a magnetic field of a sufficient value has the effect of orienting domains or crystallites in such manner that the spin moments are in the direction of the applied field. Thus a field applied parallel to the direction of wave propagation will result in a virtually complete orientation of the magnetic domains in the crystal and a maximum degree of rotation of the electromagnetic wave. A saturating field component in the opposite or antiparallel direction produces the same degree of rotation of the wave in the opposite rotational direction. Also a field applied perpendicular to the propagating wave will orient the spins in a direction which cannot interact with the wave thereby producing essentially no rotation.

In applying these principles to the operation of devices capable of operating at light frequencies, it is obvious that the ferrimagnetic medium must be transparent to the light frequencies of interest. Rare earth iron garnets are transparent to some degree. However, it is known that yttrium iron garnet, for instance, has a transmission cut-off point (arbitrarily defined as 50% absorption) in the green at approximately 5360 Angstroms. These materials have substantial light absorption even at lower frequencies which significantly reduces the amount of light radiation which the medium is capable of transmitting. This absorption is due to the $Fe^{3+}$ ion since the rare earth atom and oxygen atom are essentially colorless.

Certain new and novel compositions have now been found in which much of the ferrimagnetic property is retained while significantly increasing the light transparency of the crystalline body. These compositions involve the partial substitution of the opaque iron ions with light transparent ions, specifically silicon and/or germanium.

The molecular formula for these iron garnets may be simply represented as follows:

$$A_3Fe_2Fe_3O_{12}$$ 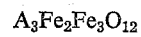

where A is yttrium or a rare earth.

The crystal structure of these materials is such that two of the iron atoms occupy octahedral sites and three iron atoms occupy tetrahedral sites (hence the separate representation: $Fe_2Fe_3$). The silicon or germanium ions characteristically substitute in the tetrahedral sites such that the substituted material may now be represented as:

$$A_3Fe_2Fe_{3-x}B_xO_{12}$$ 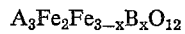

where A is yttrium or a rare earth, B is silicon or germanium and where $x$ may vary from 0 to 3.

The iron ions in either site contribute to the magnetic properties. However, the magnetic moments of the octahedral and tetrahedral iron ions oppose one another such that an equal number of ions in each site produces an antiferromagnet. That is, although yttrium iron garnet possesses a high magnetic moment, the substitution of one silicon ion for an iron ion in a tetrahedral site, which the silicon prefers, results in an equal number of tetra- and octahedral iron atoms thus producing a crystal with almost zero magnetic moment. However, additional substitution of silicon into the crystal unbalances the opposed ferrimagnetic ion with an increasing moment to a maximum occurring at around $x=1.9$ and a return to an antiferromagnetic condition at $x=2.5$.

In gadolinium iron garnet this same phenomenon occurs to some extent but it is effectively masked by the large magnetic contribution of the gadolinium ion. Hence a zero moment is not observed. Even though a significant magnetic moment is obtainable for substitutions of less than one silicon or germanium atom in gadolinum iron garnet the transparency is not sufficiently improved to consider the resulting compositions as meeting the desired ends of this invention.

The remaining rare earth garnets possess the same basic crystalline structure and can be substituted in the same manner. The effect of the substitutions of this invention while exemplified herein in terms of the behavior of yttrium iron and gadolinium iron garnets, is definitely predictable in the other rare earth garnets, the rare earth elements being considered as those having atomic numbers from 58 to 71.

Thus the compositions intended as within the scope of this invention are yttrium iron garnet or rare earth iron garnets having germanium and/or silicon atoms substituted to the extent of from greater than 1 to 2.5 total atoms per molecule. "Greater than 1" for the purposes of this invention will be considered as 1.1.

The substitution of $Si^{+4}$ or $Ge^{+4}$ ion into a site occupied by an iron atom produces an electrostatically unbalanced crystal and, in fact, this sole substitution does not occur without the undesirable reduction of $Fe^{+3}$ to $Fe^{+2}$. The presence of divalent iron has been found to detrimentally interfere with high frequency transmission in the garnet material. To obtain such a substitution, without an attendant reduction in iron atoms, a charge compensation must be made. As will be apparent to those skilled in the art, this compensation most expeditiously takes the form of a divalent substitution for the trivalent yttrium. Since the tetravalent Si or Ge substitution for trivalent atom leaves an excess cationic charge of one for each substitution and the divalent substitution for trivalent yttrium produces a cationic deficiency of one, the molecule will be electrostatically balanced if the divalent substitutions equal the tetravalent substitutions.

The preferred divalent cation for this purpose is $Ca^{+2}$. However, this ion is referred to herein by way of example only and other cations such as $Sr^{+2}$, $Mg^{+2}$ and $Mn^{+2}$ may be used alone or in combination.

According to the above considerations the ultimate compositions intended as within the scope of this invention are as follows:

$$A_{3-x}C_xFe_2Fe_{3-x}B_xO_{12}$$

where A is yttrium or a rare earth, B is silicon or germanium, C is a divalent compensating ion, and $x$ has a value between 1.0 and 2.5.

It is clear that the charge compensation represented by the addition of "C" may not require an exact equivalence between the amount of "B" and the amount of "C." Certain variations will obviously be tolerable. Accordingly, the equivalency suggested by this formula representation should be construed as an amount sufficient to compensate the molecule and not necessarily as an absolute equivalency.

These and other features of this invention will perhaps become more apparent when considered in conjunction with the drawing in which.

Figure 1:
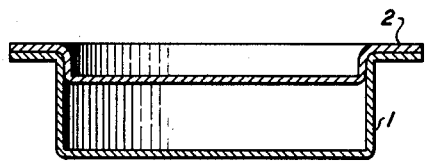
FIG. 1 is a front sectional view of the platinum dish and cover used for preparing the compositions of this invention.

The preparation of these materials involves basically a thorough mixing of the ingredients and a closely controlled firing procedure. The specific procedure is as follows:

The stoichiometric amounts of starting materials necessary to make approximately 0.001 mole of the garnet sought were carefully weighed out, mixed and ground together in an agate mortar. The mixed powder was then pressed into a ½" diameter by 1/16" thick pellet using a gauge pressure of 4 tons/in.² The pellet was removed and placed in the platinum dish shown in FIG. 1 for firing. The dish 1 and cover 2 of FIG. 1 have approximate dimensions of: 13/16" cover diameter, 5/8" dish diameter, 3/16" dish depth, 1/16" cover depth.

The initial firing is a calcining. A small section of the lip of the dish was turned up slightly to raise the cover and thus permit the escape of $CO_2$. Heating began at 200° C. and the temperature was gradually raised to 900° C. over a period of 1 to 2 hours. The pellet was then fired at a higher temperature in either air or oxygen, then cooled.

The pellet was then puverized in a "diamond mortar," ground in an agate mortar, made into a pellet again as before. The pellet was again fired. This procedure was repeated and an X-ray powder photograph taken. If the photograph indicated the presence of extraneous phases, additional firings were necessary.

In the case of germanium substitutions, small excesses of $GeO_2$ were initially included since $GeO_2$ is volatile. The sample may be weighed before and after firing to insure the predicted loss of this and other voltatile matter.

Typical amounts of ingredients and firing procedures are the following:

*Example I*

Composition: $Y_{1.12}CO_{1.88}Fe_2Fe_{1.12}Si_{1.88}O_{12}$
Materials:
  0.1265 g. $Y_2O_3$
  0.1882 g. $CaCO_3$
  0.2494 g. $Fe_2O_3$
  0.1130 g. $SiO_2$
Firing: 200° C. to 900° C., 2 hours; 1225° C. ½ hour; 1265° C., 2 hours; 1270° C., 2 hours; 1290° C., 3 hours; 1300° C., 6 hours.

*Example II*

Composition: $Y_{1.0}Ca_{2.0}Fe_{3.0}Ge_{2.0}O_{12}$
Materials:
  0.1129 g. $Y_2O_3$
  0.2002 g. $CaCO_3$
  0.2396 g. $Fe_2O_3$
  0.2092 g. $GeO_2$+0.0050 g. excess
Firing: 200° C. to 900° C., 2 hours; 1225° C., 1 hour; 1250° C., 2 hours; 1280° C., 2 hours; 1330° C., 2½ hours; 1385° C., 1½ hours.

*Example III*

Composition: $Gd_{1.5}Ca_{1.5}Fe_2Fe_{1.5}Si_{1.5}O_{12}$
Materials:
  0.2714 g. $Gd_2O_3$
  0.1514 g. $CaCO_3$
  0.2795 g. $Fe_2O_3$
  0.0901 g. $SiO_2$
Firing: 200° C. to 900° C., 2 hours; 1250° C., 1½ hours; 1280° C., 15 hours; 1300° C., 16 hours.

*Example IV*

Composition: $Gd_{1.0}Ca_{2.0}Fe_{3.0}Ge_{2.0}O_{12}$
Materials:
  0.1809 g. $Gd_2O_3$
  0.2002 g. $CaCO_3$
  0.2396 g. $Fe_2O_3$
  0.2092 g. $GeO_2$+0.0049 g. excess
Firing: 200° C. to 900° C., 2 hours; 1225° C., ½ hour; 1260° C., 3 hours; 1300° C., 3 hours; 1350° C., 2 hours; 1350° C., 2½ hours.

The properties of the materials prepared by the foregoing procedures were evaluated by plotting their 0° K. spontaneous magnetization vs. composition and also by plotting lattice constants vs. composition. These data are presented in FIGS. 2 to 5.

Figure 2:
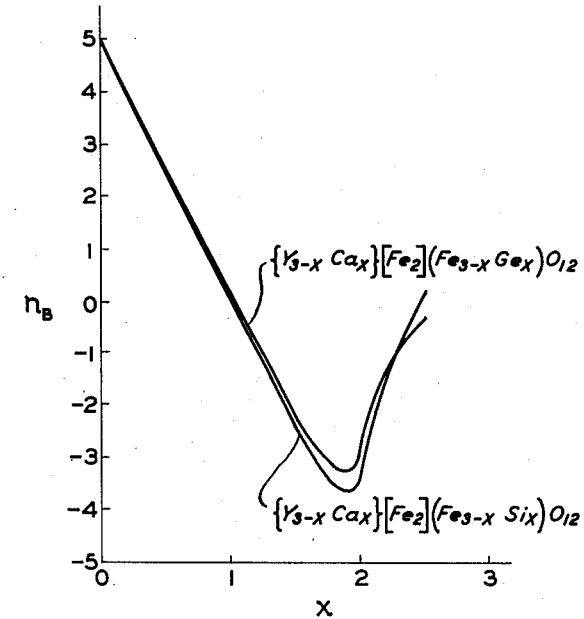
FIG. 2 is a plot showing two curves for the substitution of silicon or germanium, respectively, in yttrium iron garnet, expressed as $x$ which is the number of atoms substituted for in the formulas indicated on each curve vs. the magnetic moment in units of Bohr-Magnetons, a well-known quantitative measure of the magnetic property of a ferrimagnetic material.
Figure 2:

In FIG. 2, two curves are presented directed to $Y_{3-x}Ca_xFe_2Fe_{3-x}Ge_xO_{12}$ and $Y_{3-x}Ca_xFe_2Fe_{3-x}Si_xO_{12}$, respectively. The magnetic moment $n_b$ was measured in Bohr-Magnetons. The abscissa, $x$, specifies a composition corresponding to the formula. Note that a maximum occurs at approximately $x=1.9$ and that the moment declines to approximately zero at $x\approx1$ and $x\approx2.5$. It is significant to point out that with almost two iron atoms replaced, a large magnetic moment is retained.

Figure 3:
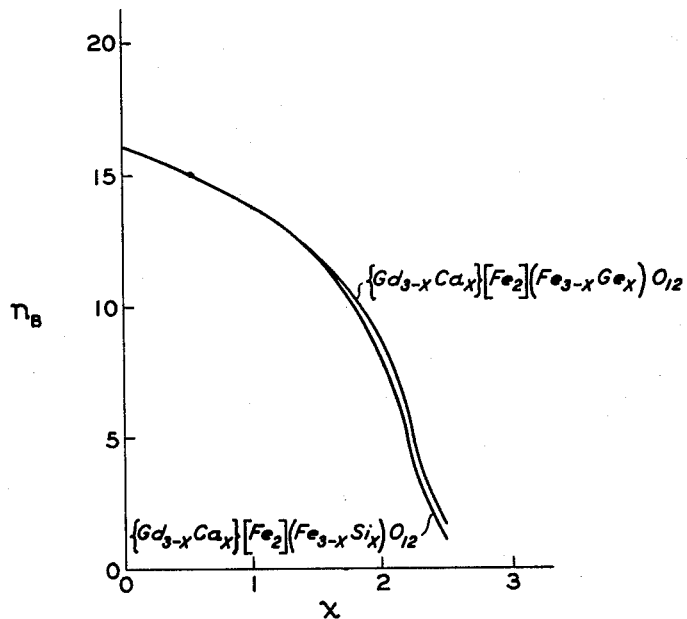
FIG. 3 is a plot again showing two curves for the substitution of silicon or germanium, respectively, in gadolinium iron garnet, expressed as $x$, which is the number of atoms substituted for in the formulas indicated on each curve vs. the magnetic moment in units of Bohr-Magnetons.

FIG. 3 presents the same type of data as FIG. 2 except that FIG. 3 is directed to substituted gadolinium iron garnet. Whereas in this garnet system a significant magnetic moment is obtainable for $x>1$, such small substitutions do not provide a sufficient increase in the transparency of the material to be considered useful for the purposes of this invention. Accordingly, here again, substitutions of germanium and/or silicon intended to be within the scope of this invention are those in which $1.1>x>2.5$.

Figure 4:
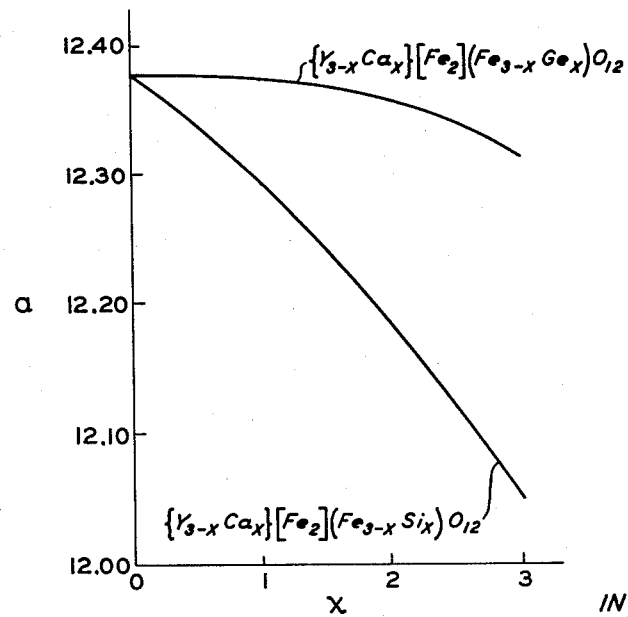
FIG. 4 is a plot of the crystal lattice constant vs. composition, the latter again expressed in terms of the extent of substitution, $x$, in yttrium iron garnet, the plot again containing two curves directed to silicon and germanium substitutions, respectively.

FIG. 4 sets forth crystal lattice constants for the yttrium substituted garnets. The lattice constant, $a$, is plotted as ordinate vs. $x$ which prescribes the composition as before. Again two curves are shown, one for silicon substituted garnets, the other for germanium substituted garnets.

Figure 5:
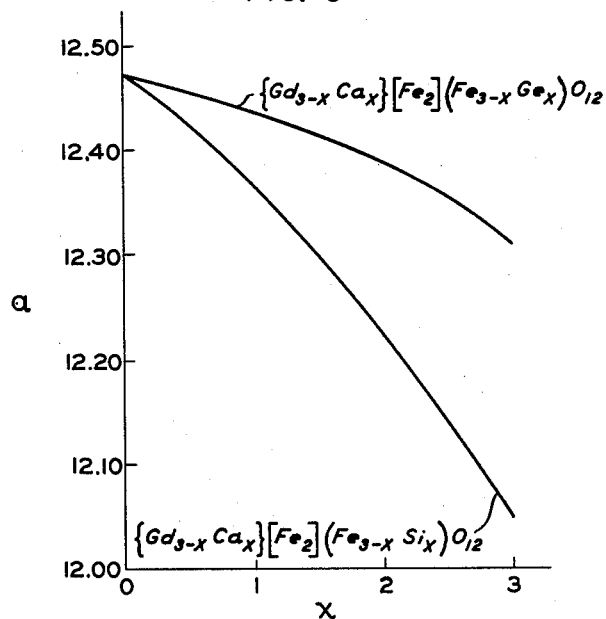
FIG. 5 is a plot similar to that of FIG. 4 showing the same relationships in gadolinium substituted garnets.

FIG. 5 presents similar lattice constant data for gadolinium substituted garnets in the same manner as in FIG. 4.

A further and very significant qualitative result was observed with the substituted garnets of this invention. Polycrystalline bodies of these garnets appear pale yellow in color. Since polycrystalline bodies tend to show color far more pronounced than single crystal bodies, this observation confirms that light absorption in these garnets is substantially less than in the unsubstituted garnets. These unsubstituted materials appear as dense black bodies in polycrystalline form. Thus, it has been shown that the transparency of the ionic substitutions, according to this invention, has materially increased the transparency of the material.

Figure 6:
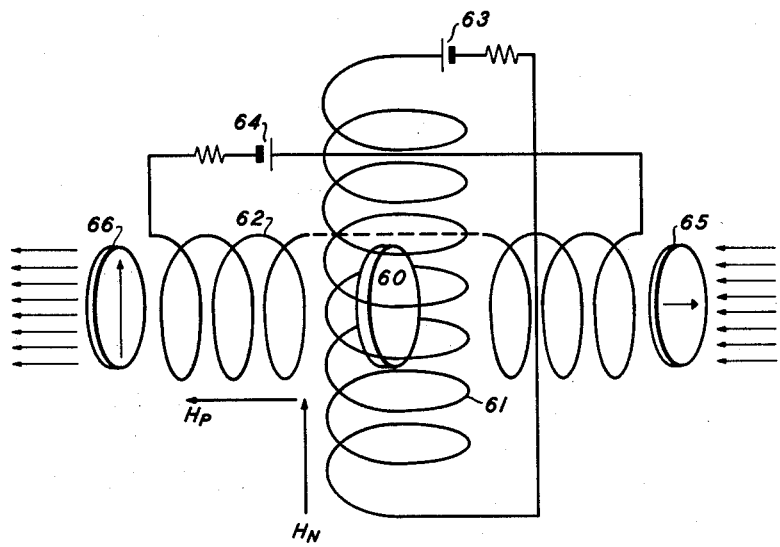
FIG. 6 is a schematic view in perspective, illustrating the operation of an optical device employing the material of this invention.

FIG. 6 shows a light rotating device adapted to utilize the transparent ferrimagnetic materials of this invention. The ferrimagnetic body 60 is placed in the influence of two magnetic fields generated by coils 61 and 62 and power sources 63 and 64. The ferrimagnetic body, consisting of one of the transparent materials of this invention, is a relatively thin cylindrical body. The transit thickness may be relatively small since these materials possess a high specific rotation (i.e., of the order of 1000°/cm.).

The light radiation entering the array to the right, as shown, may in practice be the output radiation from an optical maser. The radiation is polarized by Nicol prism 65, transmitted through the ferrimagnetic garnet body 60 and analyzed with another Nicol prism 66. Depending upon the relative influences of the magnetic fields produced by coils 61 and 62, the beam will be rotated in a controllable manner. For istance, if the parallel field, $H_p$, is sufficient to saturate the garnet (e.g., 1000 gauss) and the normal field, $H_N$, is zero, a maximum rotation will occur due to the interaction between the field and the magnetic ions described previously. If the normal field is at a saturating level while the parallel field is zero, substantially no rotation occurs. Variation of these two fields between zero and the saturation level varies the magnitude of the parallel field component, and hence, the amount of rotation. It is convenient to maintain one field or the other at saturation and modulate the light with a signal impressed upon the remaining coil. This basic modulation theory may also be used to modulate microwave radiation in the manner described in United States Patent No. 2,974,568, granted March 14, 1961.

It is obvious that combinations of the substitutions described herein will also achieve the purposes of the invention so that a garnet produced by substituting both silicon and germanium for the iron ion is within the scope of this invention. Also, materials produced by substituting silicon and/or germanium into other rare earth garnets, other than those specifically disclosed, or into garnets having combined rare earth ions are also properly considered as a part of this invention.

Various other modifications and extensions of this invention will become apparent to those skilled in the art. All such variations and deviations which basically rely on the teachings through which this invention has advanced the art are properly considered within the spirit and scope of this invention.

What is claimed is:
1. The ferrimagnetic garnet

$$Y_{3-x}Ca_xFe_2Fe_{3-x}Ge_xO_{12}$$

where $x$ has a value between 1.1 and 2.5.

2. The ferrimagnetic garnet $$Gd_{3-x}Ca_xFe_2Fe_{3-x}Ge_xO_{12}$$

where $x$ has a value between 1.1 and 2.5.

References Cited in the file of this patent
UNITED STATES PATENTS

| | | |
|---|---|---|
| 2,974,568 | Dillon | Mar. 14, 1961 |
| 3,085,980 | Gorter et al. | Apr. 16, 1963 |